INVENTOR.
Howard B. Kast
BY
Paul Fitzpatrick
ATTORNEY

United States Patent Office 3,073,329
Patented Jan. 15, 1963

3,073,329
ISOCHRONOUS GOVERNOR
Howard B. Kast, Milwaukee, Wis., assignor to General Motors Corporation, Detroit, Mich., a corporation of Delaware
Filed Aug. 22, 1960, Ser. No. 51,121
5 Claims. (Cl. 137—33)

My invention is directed to controls for power plants, and more particularly to speed and fuel controls for combustion power plants. The preferred embodiment of the invention described herein is a fuel control governor for a gas turbine engine, but it will be apparent that the invention is applicable to other uses.

My invention is directed to the provision of a speed-responsive control which combines in a relatively simple and compact structure the advantages of both proportional or droop type and isochronous governors.

By way of explanation of these terms, "proportional" or "droop type" governor as used herein means a speed-responsive controlling device which has a relatively wide range of action at any given speed setting. In practice, an engine controlled by a droop type governor will vary significantly in speed from light load to full load at any given speed setting of the governor. The term "isochronous governor" means a speed controlling device which has no significant range of operating speed at any given setting. An isochronous governor, therefore, operates to control an engine so as to maintain the speed substantially invariant with changes in load.

In the preferred embodiment of my invention, an isochronous speed-responsive device referred to as an isochronous governor resets the control point of a proportional governor to compensate for or eliminate the changes in speed with load otherwise inherent in the operation of the proportional governor.

The nature of the invention and the advantages thereof will be apparent to those skilled in the art from the succeeding detailed description of the presently preferred embodiment of the invention and the accompanying drawings thereof.

Figures 1, 2:
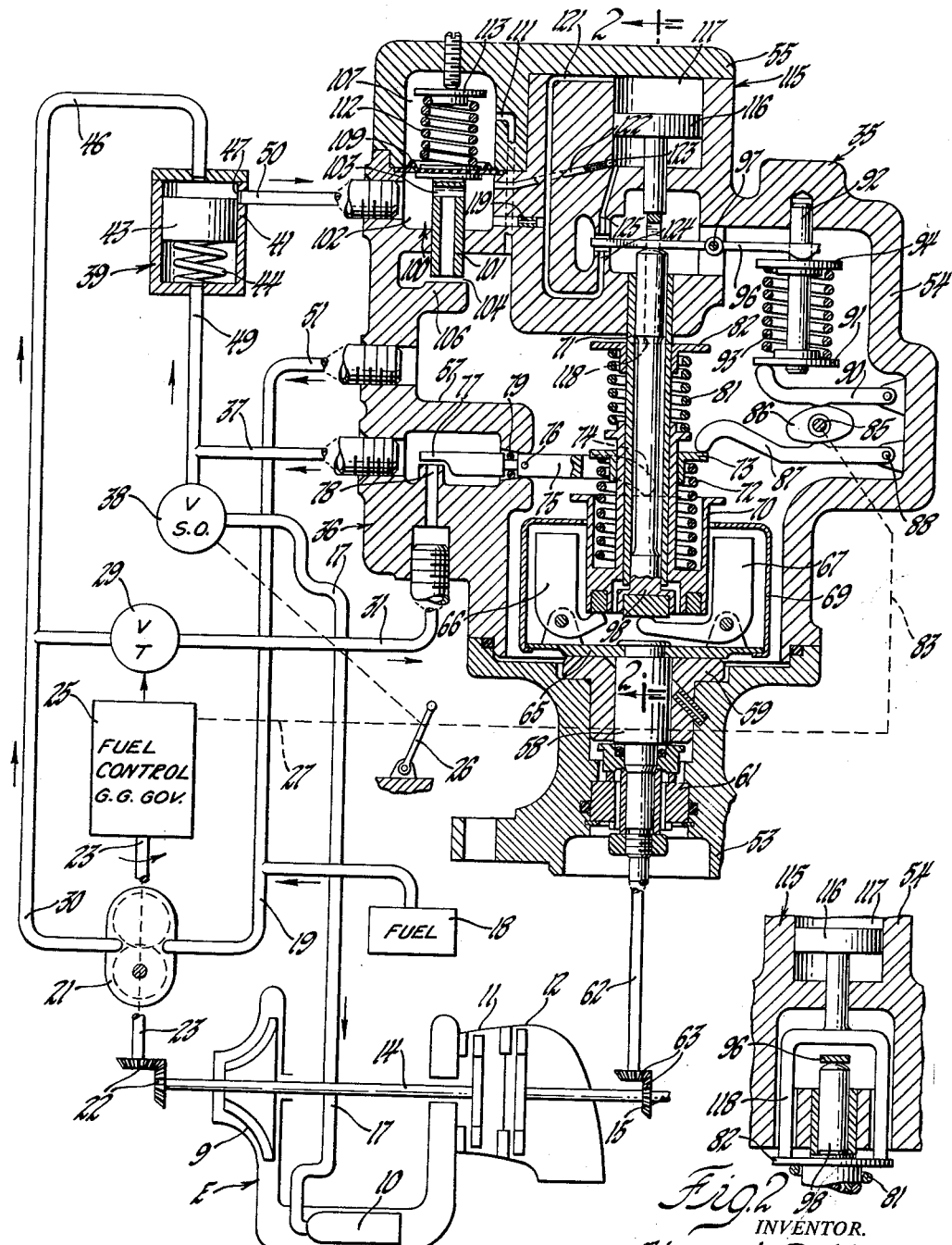
FIGURE 1 is a schematic diagram of a control system for a free turbine type gas turbine engine incorporating my invention, the governor being shown somewhat schematically.
FIGURE 2 is a fragmentary sectional view taken on the plane indicated by the line 2—2 of FIGURE 1.

Considering first the general nature of the gas turbine engine E, which is merely illustrative of various engines which may be controlled, the engine is of a well-known type comprising a compressor 9, combustion apparatus 10, a compressor-driving turbine 11, and a free power turbine 12 in series in the motive fluid path. The compressor 9 is driven by turbine 11 through a shaft 14. The power turbine 12 drives a shaft 15 which may be coupled to any suitable load. Fuel is supplied to the combustion apparatus 10 through a fuel line 17 which may terminate in any suitable spray nozzle.

Fuel taken from a source such as a tank 18 and which may be pressurized by a boost pump flows through a line 19 to a positive-displacement fuel pump 21, ordinarily of the gear type, which is driven from the shaft 14 through power takeoff gearing 22 and a shaft 23. Shaft 23 also provides a speed input to a fuel control device which generally will include a gas generator governor, that is, a governor for the aggregate of compressor 9 and turbine 11. The fuel control 25 responds to the setting of a manually operable power control lever 26, which is coupled by any suitable mechanism indicated by the broken line 27 to the fuel control 25. The fuel control may also respond to various conditions such as atmospheric pressure and temperature which are indicative of turbine fuel requirements and beneficial in controlling acceleration and deceleration of the gas generator. The mechanism of the fuel control 25 operates by any suitable means a throttling fuel metering valve 29. As a matter of practical construction, such a valve is ordinarily part of the fuel control, but for clarity of illustration it is indicated separately on the schematic.

Fuel supplied to the inlet of pump 21 through line 19 flows through line 30, valve 29, and a line 31, and through the power turbine control 35 which embodies a second throttling valve 36 in series with valve 29 (to be described). The fuel flows from control 35 through line 37, a manually operable shutoff valve 38, indicated as coupled to the manually operable control lever 26, and fuel line 17 to the engine.

Valve 38 is fully open except when the engine is shut down, and, therefore, has no effect upon normal operation of the engine. Valves 29 and 36 in series control the fuel supply to the engine, acting in conjunction with a metering head regulating bypass valve 39 such as is commonly provided in fuel metering systems. Valve 39 acts to maintain a controlled, and in this case a substantially constant, pressure drop across valves 29 and 36 in series and returns to the pump inlet excess fuel discharged by the positive displacement pump 21. As illustrated schematically, valve 39 comprises a cylinder 41 within which a piston 43 is reciprocable under the influence of a compression spring 44 and the fluid pressures exerted on the two faces of the piston. The pump discharge line 30 is connected by line 46 to the chamber above the piston 43, which has an outlet port 47 variably throttled by piston 43. Thus, pump outlet pressure biases piston 43 in the direction to open port 47. A pressure connection 49 from the metered fuel line 37 communicates with the chamber below the piston, and thus the pressure of metered fuel and the force of spring 44 tend to close port 47. Port 47 is connected through a line 50 with the control assembly 35 and through the control 35 to a fuel return or bypass line 51 which leads to the pump inlet line 19.

Considering now the nature of the power turbine control 35, this device includes the fuel metering valve 36 previously referred to, a proportional type speed-responsive device or governor directly controlling the metering valve, an isochronous governor coaxial with the proportional governor, a manually operable means for concurrently adjusting the speed setting of the two governors, and means operated by the isochronous governor for adjusting or trimming the setting of the proportional governor, including an integrating servomechanism. It also includes a servo fuel pressure control valve which regulates the pressure of fuel discharged from the metering head regulating valve 39 so as to provide a suitable and constant hydraulic head to insure satisfactory operation of the hydraulic servomechanism in the control.

Control 35 comprises a base 53 which may be mounted on the engine to be controlled, and a case 54 including a cap 55. The case defines a cavity 57 which is filled with fuel at pump inlet pressure, which may be referred to as boost pressure and which is the datum pressure of the fuel system. The chamber 57 is drained through line 51. A flyweight shaft 58 is rotatably mounted in a bushing 59 in the base 53 and sealed by any suitable shaft seal 61. Shaft 58 is connected by suitable means, indicated schematically by the drive shaft 62 and gears 63, to the power turbine shaft 15. The shaft 58 is fixed to a disk 65 on which are mounted in the usual way one or more proportional governor flyweights 66 and one or more isochronous governor flyweights 67. Each of the sets of flyweights 66 and 67 may comprise a single flyweight, or preferably two diametrically opposed flyweights, only one of which is illustrated. The flyweights are housed in a cup 69 which contains fuel and prevents undue agitation of the fuel in chamber 57 by the flyweights. Flyweights 66 act against a sleeve 70 reciprocably mounted on a tubular guide 71 pressed into a portion of the body 54. The sleeve 70 is biased against the action of the flyweights by a speeder spring 72 loaded by a movable abutment 73 reciprocable on the sleeve 70. The clevised end 74 of a lever 75 pivoted at 76 in the body bears against a flange on sleeve 70. The opposite end of lever 75 is the movable member 77 of throttling valve 36 which cooperates with a port or orifice 78 in the body. It will be apparent that reciprocating movement of sleeve 70 in response to flyweights 66 oscillates lever 75 to vary the opening of metering valve 36. An O-ring seal 79 seals off the chamber in which valve member 77 is mounted, which contains fuel under high pressure, from the chamber 57.

Sleeve 70 is biased in opposition to the effect of flyweights 66 by a second, auxiliary, or trimming speeder spring 81 acting between the upper end of sleeve 70 and an abutment 82 reciprocable on the tubular guide 71. Abutment 82 is adjusted by the isochronous governor and servomechanism to be described. Abutment 73 of spring 72 is directly adjusted by the manual control 26 which acts through any suitable connection, indicated by the broken line 83, to rotate a shaft 85 on which is mounted speed setting cam 86. Cam 86 cooperates with two speed setting cam follower levers. Lever 87, which is pivoted at 88, bears against the spring abutment 73. This connection is shown rather schematically and in practice would normally involve a clevised end on lever 87 bearing on diametrically opposite points of the abutment 73, similar to the clevised end 74 previously described. Movement of lever 26 rotating cam 86 sets spring 72 to adjust the control point of the proportional governor. It also operates a similar speed setting lever 90 which acts against a spring abutment 91 slidably mounted on a post 92 fixed in the body 54. A speeder spring 93 for the isochronous governor lies between abutment 91 and a second slidable abutment 94. Abutment 94 bears against one end of a rocker arm 96 pivoted at 97 which bears against the upper end of a push rod 98, the lower end of which is acted upon by the speed weights 67 of the isochronous governor. Push rod 98 is reciprocably mounted within the tubular guide 71. The force or movement of speed weights 67 is transmitted through push rod 98 and rocker arm 96 to spring 93, which is set to the same speed setting as spring 72 of the proportional governor by cam 86.

Rocker arm 96 also controls integrating hydraulic servomechanism which adjusts the secondary speeder or trimming spring 81 of the proportional governor. Fuel utilized by the servomechanism is controlled by a servo fuel pressure control or regulating valve, indicated generally as 100, which comprises a hollow valve plunger 101 reciprocable in a wall in the case 54 which divides the boost pressure filled chamber 57 from a chamber 102 into which the bypass fuel line 50 discharges. Fuel may flow from chamber 102 through the lateral ports 103 and the central bore of the tubular valve member 101 and out through the annular orifice 104 between member 101 and a fixed valve seat 106. Valve 100 is biased in the opening direction by the pressure of fuel in chamber 102. It is biased in the closing direction by the pressure of fuel in chamber 107 which is separated from chamber 102 by a diaphragm 109 fixed to the valve member 101. Chamber 107 is connected by a passage 111 with chamber 57 so that it contains fuel at boost pressure, which is also the discharge pressure of the servomechanism to be described. Valve 100 is also biased in the closing direction by a compression spring 112 bearing against an adjustable abutment 113. As will be apparent, valve 100 operates to maintain the pressure in chamber 102 at a value above boost pressure determined by the force of spring 112 and the area of diaphragm 109. This pressure difference may conveniently be some such value as fifty pounds per square inch, which is suitable for operation of such servomechanisms as are ordinarily present in fuel controls. The pressure in chamber 102, which may be referred to as controlled servo fuel pressure, is supplied to a servomechanism 115 comprising a piston 116 reciprocable in a cylinder 117. The piston 116 has a piston rod terminating in a forked end 118 which bears against the spring retainer 82. Servo fuel is supplied to the upper end of cylinder 117 through an orifice 119 and passage 121. It is supplied to the lower end of cylinder 117 through a passage 122 including an orifice 123. The two ends of the cylinder are connected to a flapper type control valve having discharge ports 124 and 125 controlled by one end of rocker arm 96, which is disposed between the two ports. This is a known type of servomechanism. Any departure of rocker arm 96 from its normal or neutral position midway between the ports 124 and 125 will throttle one port to a greater extent than the other, creating a pressure differential in the cylinder 117 tending to move the piston 116 and thereby vary the force of the spring 81. The clearance between arm 96 and the ports 124 and 125 may be very small, so that travel of push rod 98 is negligible. Governor 67, 93, etc., is therefore isochronous.

Considering now the operation of the control system illustrated, the fuel supplied to the turbine engine may be limited by either of the metering valves 29 and 36. Metering valve 29 will serve to govern or limit the speed of the gas generator turbine 11. Metering valve 36 will govern or limit the speed of power turbine 12. In a system as shown, the two metering valves ordinarily are coordinated, but, since either may limit the fuel, the supply of fuel ordinarily will be governed so that neither turbine can exceed the speed set for it by the power control lever 26. Some of the considerations underlying the control of free turbine type power plants are set out at greater length in application Serial No. 854,688, filed November 23, 1959, of which I am a co-inventor, of common ownership with this application. Such matters, however, are not believed to be necessary to an understanding of the present invention.

Referring more particularly to the governing of the power turbine, the speed of shaft 15 will depend upon the gas flow delivered by the gas generator (which in turn depends primarily upon the amount of fuel supplied) and upon the work done by the power output shaft 15. As long as the speed of shaft 15 is below that for which the governor 35 is set, metering valve 36 may remain wide open and fuel may be limited only by valve 29 of the gas generator fuel control. If, however, because of increase of gas horsepower or decrease of load, the speed of shaft 15 reaches the governing point set by the lever 26 through cam 86 and spring abutment 73, the flyweight 66 will rock arm 75 to move valve member 77 in a closing direction. The accompanying increase in resistance to flow of fuel will decrease the supply of fuel to the engine, and thereby the gas horsepower and ultimately the power turbine speed. The simple governor consisting of flyweight 66 and spring 72 will, of course, have a sloping or drooping characteristic such that the governed speed of the engine will be a function of the load, the speed decreasing as load increases. Such a governor characteristic is advantageous from the standpoint of stability and simplicity of control, but not for accurate speed regulation. However, assuming that the operation of the proportional governor brings the speed below the set point which is also the set point of the isochronous governor, the isochronous governor will respond to this underspeed condition by a counterclockwise movement of rocker arm 96 as illustrated, throttling valve port 124. This will cause an increase of pressure in cylinder 117 above piston 116 and the piston will move to increase the load of spring 81, the auxiliary spring of the proportional governor. As long as the engine is underspeed, this gradual increase in spring loading will continue until the proportional governor has been reset to govern the engine at the speed setting of the isochronous governor called for by lever 26. When the engine is on speed as determined by the isochronous governor, the loading of the proportional governor remains constant. If the engine should go overspeed, the isochronous governor will operate piston 116 in the opposite direction to reduce the loading on spring 81 and thereby reduce the fuel flow and the speed of the shaft 15. It should be borne in mind that spring 93 of the isochronous governor and spring 72 of the proportional governor are set to the same speed, assuming some value of engine load and some initial loading of the auxiliary spring 81. If conditions such as variations in load cause the power turbine to go off speed, loading of the auxiliary spring 81 is accordingly increased or decreased.

In operation of the governor, therefore, a step change in load will result in an initial change in engine speed along the sloping characteristic of the proportional governor which, however, will be corrected by the action of the isochronous governor. The proportional governor can respond very quickly to prevent large speed changes.

Moreover, in the system shown, failure of the isochronous governor or its servo to operate merely introduces a reasonable error into the output of the proportional governor. In other words, the proportional governor is no longer corrected to eliminate the result of the sloping characteristic, but it remains a usable proportional governor. The speed error in this case might be something like three percent. If there is no supply of servo fuel at all to the servomotor 115, the spring 81 will simply move abutment 82 upward until it reaches its upper limit of movement.

It is apparent that the governor 35 is capable of use independently of other governing of fuel controlling devices. For example, in a single shaft turbine, the governor 35 might provide speed control or speed limiting of the gas turbine; or similarly control any other engine by regulating the supply of fuel or motive fluid thereto.

The means described herein for supply of servo fuel are the subject matter of my companion application Serial No. 50,918, filed August 22, 1960.

The detailed description herein of the preferred embodiment of the invention for the purpose of explaining the principles thereof is not to be considered as limiting or restricting the invention, since many modifications may be made by the exercise of skill in the art within the scope of the invention.

I claim:

1. A speed-responsive governor comprising, in combination, rotatable input means, first and second speed-responsive devices driven thereby, means for regulating the speed of the input means operated by the first speed-responsive device, first and second speed setting means concurrently effective to vary the speed setting of the first speed-responsive device, a third speed setting means effective to vary the speed setting of the second speed-responsive device, control means operable upon the first and third speed setting means for coincidental adjustment thereof, and integrating means, actuated by the second speed-responsive device in response to departure of input means speed from the speed setting of the second speed-responsive device, connected to the second speed setting means and operative to vary the speed setting of the first speed-responsive device to correct the speed of the input means.

2. A speed-responsive governor comprising, in combination, rotatable input means, first and second speed-responsive devices driven thereby, means for regulating the speed of the input means operated by the first speed-responsive device, first and second speeder spring means concurrently effective to determine the speed setting of the first speed-responsive device, a third speeder spring means effective to determine the speed setting of the second speed-responsive device, control means operable upon the first and third speeder spring means for coincidental adjustment thereof, and integrating means, actuated by the second speed-responsive device in response to departure of input means speed from the speed setting of the second speed-responsive device, connected to the second speeder spring means and operative to vary the speed setting of the first speed-responsive device to correct the speed of the input means.

3. A system the speed of which is to be controlled comprising, in combination, a first governor having a relatively wide throttling range, a second governor having a relatively narrow throttling range considered a control point, a common speed adjusting means coupled to both governors, a common speed input to both governors, means actuated by the first governor controlling the speed of the input, and means actuated by the second governor responsive to disparity of the speed of the input from the control point of the second governor effective to readjust the first governor and thus reset the system to reach equilibrium at the control point of the second governor.

4. A system the speed of which is to be controlled comprising, in combination, a first governor having a relatively wide throttling range, a second governor having a relatively narrow throttling range considered a control point, a common speed adjusting means coupled to both governors, a common speed input to both governors, means actuated by the first governor controlling the speed of the input, and means including an integrating servo-mechanism actuated by the second governor responsive to disparity of the speed of the input from the control point of the second governor effective to readjust the first governor and thus reset the system to reach equilibrium at the control point of the second governor.

5. A system the speed of which is to be controlled comprising, in combination, a first governor having a relatively wide throttling range, a second governor having a relatively narrow throttling range considered a control point, each governor including a flyweight, a common speed adjusting means coupled to both governors, a common speed input shaft mounting the flyweights of both governors, means actuated by the first governor controlling the speed of the input shaft, and means actuated by the second governor responsive to disparity of the speed of the input shaft from the control point of the secnd governor effective to readjust the first governor and thus reset the system to reach equilibrium at the control point of the second governor.

References Cited in the file of this patent

UNITED STATES PATENTS

| 2,855,029 | Eastman | Oct. 7, 1958 |
| 2,926,681 | Chilman | Mar. 1, 1960 |
| 2,949,957 | Eastman | Aug. 23, 1960 |

OTHER REFERENCES

"Industrial Automatic Controls" (La Joy), published by Prentice-Hall, Inc., (New York), 1954, page 93 relied on. (Copy in Scientific Library.)